US006842181B2

(12) United States Patent
Acharya

(10) Patent No.: US 6,842,181 B2
(45) Date of Patent: Jan. 11, 2005

(54) EULER VECTOR FOR COLOR IMAGES

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/279,536

(22) Filed: Oct. 23, 2002

(65) Prior Publication Data

US 2004/0080513 A1 Apr. 29, 2004

Related U.S. Application Data

(63) Continuation-in-part of application No. 09/722,979, filed on Nov. 27, 2000, and a continuation-in-part of application No. 09/722,982, filed on Nov. 27, 2000.

(51) Int. Cl.[7] .................................................. G09G 5/02
(52) U.S. Cl. ...................................................... 345/589
(58) Field of Search .......................... 345/89, 581, 589, 345/472, 603, 610, 660, 690, 800, FOR 166, 173; 382/260–265

(56) References Cited

U.S. PATENT DOCUMENTS

| 4,743,959 A | * | 5/1988 | Frederiksen ............ 375/240.25 |
| 6,213,579 B1 | * | 4/2001 | Cornell et al. ................. 347/14 |
| 6,598,798 B1 | * | 7/2003 | Kashi et al. ............ 235/462.25 |
| 2003/0190081 A1 | * | 10/2003 | Tsuboi et al. ................ 382/239 |

* cited by examiner

Primary Examiner—Matthew C. Bella
Assistant Examiner—G. F. Cunningham
(74) Attorney, Agent, or Firm—Joni Stutman-Horn

(57) ABSTRACT

Embodiments of a technique for computing a Euler vector for a color image are disclosed.

20 Claims, 3 Drawing Sheets

AFRICA

Most significant bit plane ($g_7$)
Euler Number = 79

Bit plane ($g_6$)
Euler Number = -13

Bit plane ($g_5$)
Euler Number = -391

Bit plane ($g_4$)
Euler Number = -1624

EULER VECTOR = { 79, -13, -391, -1624 }

8-neighborhood Example

N x M pixel matrix

AFRICA

Most significant bit plane ($g_7$)
Euler Number = 79

Bit plane ($g_6$)
Euler Number = -13

Bit plane ($g_5$)
Euler Number = -391

Bit plane ($g_4$)
Euler Number = -1624

*EULER VECTOR = { 79, -13, -391, -1624 }*

EULER VECTOR FOR COLOR IMAGES

RELATED APPLICATIONS

This patent application is a U.S. Continuation-In-Part patent application of U.S. patent application Ser. No. 09/722,979, filed on Nov. 27, 2000, titled "Computing the Euler Number of a Binary Number," by Acharya et al., and U.S. patent application Ser. No. 09/722,982, filed on Nov. 27, 2000, titled "Developing A Euler Vector for Images," filed on Nov. 27, 2000, by Acharya et al., both assigned to the assignee of the current invention and herein incorporated by reference.

BACKGROUND

This patent application is related to Euler numbers and vectors and, more particularly, Euler numbers and vectors for images, such as color images.

Numeric characterization of images for relatively efficient management of an image database is a challenging problem in image processing. Further, it is desirable that the characteristic parameters of the image remain relatively invariant in the presence of various perturbations and/or transformations. Determination of a compact set of parameters for images which is, for example, relatively easy to compute, suitable for database search, and/or is robust against transformations, is, therefore, desirable in the emerging domain of internet technology, for example, to search images on-line.

BRIEF DESCRIPTION OF THE DRAWINGS

The subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

Although the claimed subject matter is not limited in scope in this respect, aforementioned patent application U.S. patent application Ser. No. 09/722,979, titled "Developing an Euler vector for images", by Acharya et al., filed on Nov. 27, 2000 (attorney docket P10405), describes one or more methodologies to generate a characterization parameter for gray-tone images. Likewise, a characterization parameter for color imagery in order to index and search color images in an image database would also be desirable. Moreover, it would be desirable if such a parameter were relatively invariant to lighting condition, contrast sensitivity and/or color balance for a typical electronically generated digital image. This would make such an approach suitable for indexing and/or searching of color images from a color image database/depository, for example.

Figure 1:
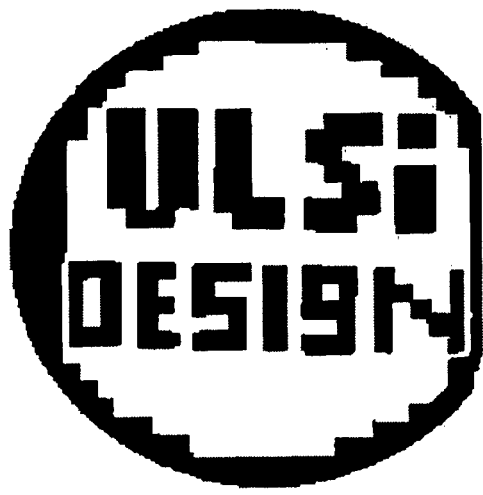
FIG. 1 is a schematic diagram illustrating a sample binary logo.
Figure 4:
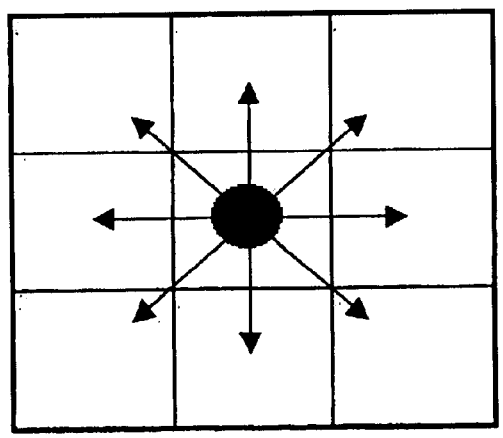
FIG. 4 is a schematic diagram illustrating an embodiment of an 8-neighbor connected component.

Here, let the binary image be represented by a 0–1 pixel matrix of size (N×M), in which an object or background pixel is denoted as 1 or 0, respectively. For a binary image, a Euler number is a well known geometric feature which is defined as the difference between the number of "connected components" (objects) and the number of "holes". In FIG. 1, an example is shown of a binary logo image with 12 connected components (black regions, or foreground) and 3 holes (white regions or background). Hence, the Euler Number of the "VLSI Design" logo (as shown in FIG. 1) is 12−3=9.

In a binary image, a "connected component" refers to a set of object pixels such that any object pixel in the set is in the 8 (or 4) neighborhood of at least one object pixel of the same set, as shown in FIG. A 4 neighborhood of a pixel at location (x, y) in a Cartesian coordinate system refers to the set of pixels at locations $\{(x-1, y), (x+1, y), (x, y-1), (x, y+1)\}$. Similarly, an 8 neighborhood of a pixel at location (x, y) refers to the set of pixels at locations $\{(x-1, y-1), (x-1, y), (x-1, y+1), (x, y-1), (x, y+1), (x+1, y-1), (x+1, y), (x+1, y+1)\}$.

On the other hand, a "hole" is a set of background pixels such that any background pixel in the set is in the 4 (or 8) neighborhood of at least one background pixel of the same set and this entire set of background pixels is enclosed by a connected component. A computationally efficient process for generation of a Euler Number of a binary image is described in U.S. patent application Ser. No. 09/722,982, titled "Computing the Euler number of a binary image", by Acharya et al., filed on Nov. 27, 2000, assigned to the assignee of the present invention. Of course, the claimed subject matter is not limited in scope to the approach described in the foregoing patent application.

The concept of a Euler vector, as described, for example, in the aforementioned patent applications, may be extended. Therefore, in this particular embodiment, a Euler number may be generated from the gray code representation of the 4 most significant bit planes of the image as described hereinafter, although the claimed subject matter is not limited in scope in this respect. A bit plane comprises 0s and 1s, and hence may form a binary (two-tone) image and its gray code representation may do so as well. A Euler number of the partial image formed by the gray codes of the 4 most significant bit planes may thus be computed to produce 4 Euler numbers. This may generate a 4-tuple of integers which is defined in this context to be the Euler vector of the original gray-tone image.

Figure 2:
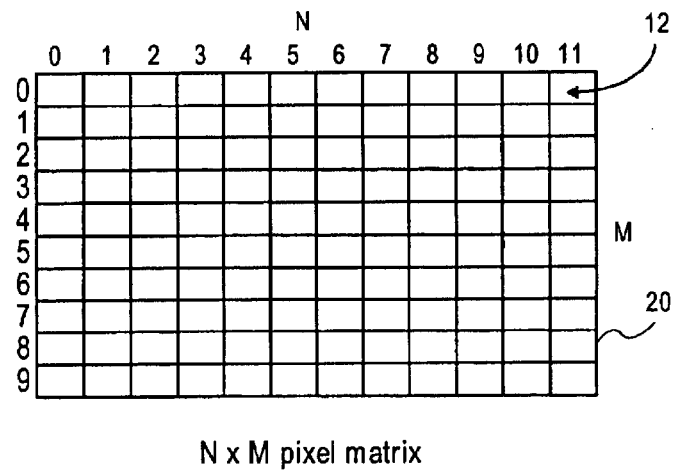
FIG. 2 is a schematic diagram illustrating an embodiment of an N×M pixel matrix.
Figure 3:
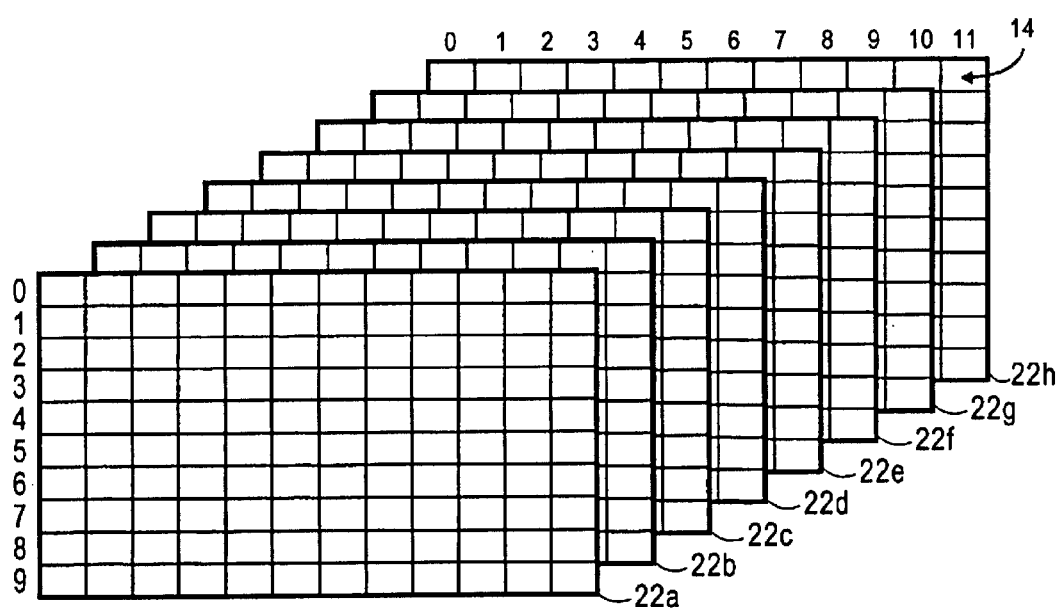
FIG. 3 is a schematic diagram illustrating an embodiment showing the bit planes of a gray-tone image.

A gray-tone image may be represented as an (N×M) matrix, one element of which is an integer in the range [0, 255] (inclusive of 0 and 255), denoting the intensity of the corresponding pixel. Thus, an intensity value of a pixel may be represented by an 8-bit binary vector ($b_7$, $b_6$, $b_5$, $b_4$, $b_3$, $b_2$, $b_1$, $b_0$). An image therefore may comprise 8 bit planes, as shown in FIG. 3. FIG. 2 represents a single bit plane.

To define a Euler vector, the first 4 most significant bit planes (corresponding to ($b_7$, $b_6$, $b_5$, $b_4$)) are retained. These 4-bit binary vectors are converted to a corresponding reflected gray code ($g_7$, $g_6$, $g_5$, $g_4$), which, in this particular embodiment may comprise:

$g_7=b_7$; $g_6=b_7/b_6$; $g_5=b_6/b_5$; $g_4=b_5/b_4$, where denotes an XOR (modulo-2) operation. It is well known that for any binary vector, the corresponding reflected gray code is unique and vice-versa.

Figure 5:
FIG. 5 are images illustrating the gray code bit planes and the Euler vector of a sample gray-tone image "AFRICA".
Figure 5:
Figure 5:
Figure 5:
Figure 5:

In this particular context, the Euler vector of a gray-tone image comprises a 4-tuple $E=\{E_7, E_6, E_5, E_4\}$, where $E_i$ is the Euler number of the partial two-tone image formed by the i-th bit-plane, $7 \leq i \leq 4$, corresponding to a reflected gray code representation of intensity values. Example: For the image shown in FIG. 5, the Euler vector is $E=\{79, -13, -391, -1624\}$.

Gray code representation of intensity values offers a potential advantage over standard binary representation in this particular context. A Euler vector may be relatively insensitive to noise and other changes, if a gray code is used. In many instances, for example, a small change in intensity values in an image will not affect all 4 bit planes in a gray representation.

As is well known, a color pixel, in a display quality color image, has three primary color components—Red (R), Green (G), and Blue (B). Hence, a color image may be considered as composition of three color planes R, G, B and a color component, such as these, may be considered or treated as a gray-tone image. A technique, therefore, to represent a color image is to define three 4-tuples $E_R$, $E_G$, $E_B$ corresponding to the three color planes. This would involve a computation of 12 Euler numbers (4 for each of $E_R$, $E_G$, $E_B$). This may be computationally undesirable as it may involve an excessive computational burden. Moreover, the color balance of the query image and the image stored in the database may not be identical. More to the point, generating the Euler vectors by this approach may produce divergent values for ($E_R$, $E_G$, $E_B$) for images with substantially identical content at different lighting conditions and possibly a different color appearance. This may therefore undesirably affect search results with a query image from an image database.

Alternatively, the color image may be converted into a Luminance-Chrominance space, such as Y-Cb-Cr space, for example. Then, applying dynamic stretching to rescale the luminance (Y) space over the dynamic range to 0–255 values, for example, may allow the more significant information to reside in the most significant 4 bit planes. For example, an image may appear dark if captured under poor lighting condition. Assume that all the pixel values in this image belong to the range [0–30] as an example. If the image is represented by 8 bit pixels, most significant 3 bits of the pixels will likely be 0s and changes will be observed in the least 5 significant bits. As a result, the Euler vector generated from the 4 most significant bit planes will become impractical. On the other hand, dynamic stretching may be applied, such as by using a linear scale, so that the pixel values are stretched to [0–255]. Hence the most significant 4 bit information will likely contain meaningful information. One simple technique to linearly scale is transforming every pixel x by the formula x'=255*(x-min)/(max-min), where 'max' and 'min' are the maximum and minimum values of the pixels in the image, although, of course, the claimed subject matter is not limited in scope in this respect. However, if this particular scaling technique is applied, the pixel with a maximum value will be transformed to 255 and the pixel with minimum value will be transformed to 0 and other pixels will be scaled proportionately. Hence the four most significant bit plane will have potentially meaningful values, irrespective of any lighting condition. A Euler vector using these 4 bit planes to represent the color image may then be stored as the index of the image in the database.

Below is an embodiment of a process for producing a Euler vector for a color image, although the claimed subject matter is not limited to this particular embodiment. In this embodiment, the input data or signal information capable of being represented in electronic form, for example, comprises a color image, $I_C$. Likewise, the output data produced or signal information capable of being represented in electronic form, for example, comprises a Euler vector. The color space of the input image $I_C$ is converted to Luminance-Chrominance (Y-Cb-Cr) space. The color space conversion from R-G-B pixels at pixel location (m,n) to Y-Cr-Cb is typically done using the following transformation, although, again, the claimed subject matter is not limited in scope in this respect. Other potential color transformations may be applied and remain within the scope of the claimed subject matter. Here, R(m,n), G(m,n) and B(m,n) represent the values of Red, Green and Blue color components of a full color pixel at location (m,n) whereas Y(m,n) represents the corresponding luminance component and Cr(m,n) and Cb(m,n) represent the two corresponding chrominance components at location (m,n).

$$Y(m,n)=0.299*R(m,n)+0.587*G(m,n)+0.114*B(m,n)$$

$$Cr(m,n)=-0.169*R(m,n)-0.331*G(m,n)+0.500*B(m,n)$$

$$Cb(m,n)=0.500*R(m,n)-0.419*G(m,n)-0.081*B(m,n)$$

"The Luminance (Y) plane of the color converted image may be extracted by forming the pixel matrix using the Y values for the (m,n) locations. In order to remove or reduce noise present in the image, some noise filtering may be applied before adjusting the dynamic range of the Y plane. Typically, median filtering followed by mean filtering is applied to reduce most of the common types of noise components present, although, again, the claimed subject matter is not limited in scope in this respect. Noise filtering is not restricted to these two filtering techniques. Any low-pass filter type noise filtering technique may be applied and provide adequate results. The dynamic range of the Y plane may then be linearly rescaled to [0–255] to yield output data or signal information Y'. The first 4 most significant binary bit planes of Y' may then be employed to generate a Euler Vector for the color image. The 4-bit vectors may then be converted to corresponding reflected gray codes. The Euler numbers $B_7$, $E_6$, $E_5$, $E_4$ for the 7, 6, 5 and $4^{th}$ bit plane respectively, may be computed. The Euler Vector $E_y=\{E_7, E_6, E_5, E_4\}$ may then be produced."

It will, of course, be understood that, although particular embodiments have just been described, the claimed subject matter is not limited in scope to a particular embodiment or implementation. For example, one embodiment may be in hardware, such as implemented to operate on an integrated circuit chip, for example, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging or video system, for example, may result in an embodiment of a method in accordance with the claimed subject matter being executed, such as an embodiment of a method of producing a Euler vector for a color image, for example, as previously described. For example, an image or video processing platform or another processing system may include a video or image processing unit, a video or image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. A method of producing a Euler vector for a color image comprising:

scaling luminance values of the color image;

gray coding the scaled luminance values; and generating a Euler vector for the color image based at least in part on results of the scaled luminance values.

2. The method of claim 1, wherein the luminance values are binary, and further comprising omitting the lesser significant binary values from gray coding.

3. The method of claim 2, wherein the luminance values comprise eight bits and the four least significant bits are omitted from gray coding.

4. The method of claim 1, wherein the color image is in RGB color format, and prior to scaling, converting the color image to a chrominance-luminance format.

5. The method of claim 3, wherein the chrominance-luminance format comprises YCrCb format.

6. The method of claim 1, wherein scaling comprises scaling to a specified range.

7. The method of claim 6, wherein the specified range comprises 0 to 255.

8. The method of claim 1, wherein the scaling comprises linear scaling.

9. The method of claim 1, and further comprising, prior to scaling, noise filtering the color image.

10. The method of claim 7, wherein noise filtering comprises applying median and mean filtering.

11. An article comprising: a storage medium, said storage medium having stored thereon instructions, said instructions, when executed, resulting in the performance of a method of producing a Euler vector for a color image by:

scaling luminance values of the color image;

gray coding the scaled luminance values; and generating a Euler vector for the color image based at least in part on results of the scaled luminance values.

12. The article of claim 11, wherein said instructions, when executed, further resulting in the luminance values being binary, and the lesser significant binary values being omitted from gray coding.

13. The article of claim 12, wherein said instructions, when executed, further resulting in the luminance values comprising eight bits and the four least significant bits being omitted from gray coding.

14. The article of claim 11, wherein said instructions, when executed, further resulting in the color image being in RGB color format, and prior to scaling, the color image being converted to a chrominance-luminance format.

15. The article of claim 14, wherein said instructions, when executed, further resulting in the chrominance-luminance format comprising YCrCb format.

16. The article of claim 11, wherein said instructions, when executed, further resulting in scaling comprising scaling to a specified range.

17. The article of claim 16, wherein said instructions, when executed, further resulting in the specified range comprising 0 to 255.

18. The article of claim 11, wherein said instructions, when executed, further resulting in the scaling comprising linear scaling.

19. The article of claim 11, wherein said instructions, when executed, further resulting in, prior to scaling, noise filtering the color image.

20. The article of claim 19, wherein said instructions, when executed, further resulting in noise filtering comprising applying median and mean filtering.

* * * * *